(12) United States Patent
Moteki et al.

(10) Patent No.: US 8,927,447 B2
(45) Date of Patent: Jan. 6, 2015

(54) CERAMIC SINTERED BODY

(71) Applicant: NGK Spark Plug Co., Ltd., Nagoya (JP)

(72) Inventors: Jun Moteki, Inuyama (JP); Yusuke Katsu, Komaki (JP); Takeshi Mitsuoka, Konan (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 14/348,651

(22) PCT Filed: Jun. 10, 2013

(86) PCT No.: PCT/JP2013/065952
§ 371 (c)(1),
(2) Date: Mar. 31, 2014

(87) PCT Pub. No.: WO2014/002743
PCT Pub. Date: Jan. 3, 2014

(65) Prior Publication Data
US 2014/0242383 A1    Aug. 28, 2014

(30) Foreign Application Priority Data
Jun. 28, 2012    (JP) ................ 2012-145676

(51) Int. Cl.
| | | |
|---|---|---|
| *C04B 35/119* | (2006.01) | |
| *C04B 35/56* | (2006.01) | |
| *C04B 35/106* | (2006.01) | |
| *C04B 35/645* | (2006.01) | |

(52) U.S. Cl.
CPC ............ *C04B 35/106* (2013.01); *C04B 35/119* (2013.01); *C04B 35/5626* (2013.01); *C04B 35/645* (2013.01); *B23B 2226/18* (2013.01); *C04B 2235/3217* (2013.01); *C04B 2235/3225* (2013.01); *C04B 2235/3246* (2013.01); *C04B 2235/3843* (2013.01); *C04B 2235/3847* (2013.01); *C04B 2235/3856* (2013.01); *C04B 2235/3886* (2013.01); *C04B 2235/5436* (2013.01); *C04B 2235/5445* (2013.01); *C04B 2235/6562* (2013.01); *C04B 2235/72* (2013.01); *C04B 2235/85* (2013.01); *C04B 2235/96* (2013.01); *C04B 2235/9607* (2013.01)
USPC .................. 501/105; 501/88; 407/119

(58) Field of Classification Search
CPC .................. C04B 35/119; C04B 35/5626
USPC ..................... 501/88, 105; 407/119
See application file for complete search history.

(56) References Cited

U.S. PATENT DOCUMENTS 4,366,254  A  *  12/1982  Rich et al. .................. 501/89

FOREIGN PATENT DOCUMENTS

| | | | |
|---|---|---|---|
| CN | 101121971 | * | 2/2008 |
| JP | 2511700 B2 | | 7/1996 |
| JP | 2000-128626 A | | 5/2000 |
| JP | 2001-019537 A | | 1/2001 |

(Continued)

OTHER PUBLICATIONS

International Search Report of PCT/JP2013/065952 dated Aug. 20, 2013.

*Primary Examiner* — Karl Group
(74) *Attorney, Agent, or Firm* — Sughrue Mion, PLLC

(57) ABSTRACT

A ceramic sintered body includes tungsten carbide, zirconia, and alumina. The content of the tungsten carbide is 20 to 50 vol %, and the content of the zirconia is 5 to 25 vol %. The crystal phase of the zirconia is a tetragonal crystal or a mixture of tetragonal and monoclinic crystals. The ceramic sintered body does not substantially include Ti compounds. The average particle diameter of the tungsten carbide, the average particle diameter of the zirconia, and the average particle diameter of the alumina are all 1 μm or less.

3 Claims, 2 Drawing Sheets

(56) References Cited

FOREIGN PATENT DOCUMENTS

| JP | 3145470 | B2 | 3/2001 |
| JP | 2002-194474 | A | 7/2002 |
| JP | 4177493 | B2 | 11/2008 |
| JP | 2010-235351 | A | 10/2010 |

* cited by examiner

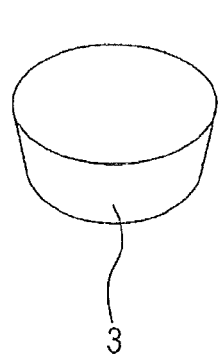 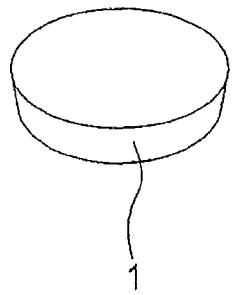 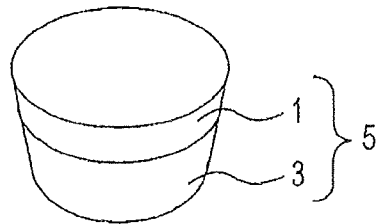
FIG.2A  FIG.2B

CERAMIC SINTERED BODY

CROSS-REFERENCE TO RELATED APPLICATIONS

This is a National Stage of International Application No. PCT/JP2013/065952 filed Jun. 10, 2013, claiming priority based on Japanese Patent Application No. 2012-145676 filed Jun. 28, 2012, the contents of all of which are incorporated herein by reference in their entirety.

TECHNICAL FIELD

The present invention relates to a ceramic sintered body that can be used for, for example, a cutting tool and the like.

BACKGROUND ART

Heat resistant super alloys have excellent heat resistance, while they are very difficult to machine. Therefore, tools used for cutting heat resistant super alloys are required with high physical properties and heat resistance. Alumina-based materials that contain silicon carbide whiskers (hereafter referred to as SiC whiskers) have high hardness, toughness, and heat resistance, and tools made of such materials demonstrate superior performance in cutting heat resistant super alloys to that of other tools. However, there is a problem in that SiC whiskers are expensive.

Therefore, materials other than SiC whiskers have been considered. Patent Documents 1 and 2 disclose materials in which alumina is added with carbide, nitride, and/or carbonitride (so-called black ceramics). Black ceramics have higher strength than alumina due to dispersion strengthening in which a sintered body is strengthened by dispersing carbide, etc. in alumina. Among other things, black ceramics using extremely hard tungsten carbide are materials having high hardness and excellent wear resistance.

Patent Documents 3 and 4 disclose materials in which zirconia is dispersed in alumina (so-called white ceramics). White ceramics have improved strength due to dispersion of zirconia. Although white ceramics have lower hardness compared with black ceramics, white ceramics have improved toughness due to transformation toughening imparted by the use of partially stabilized zirconia.

PRIOR ART DOCUMENTS

Patent Documents

Patent Document 1: Japanese Patent Publication No. 3145470
Patent Document 2: Japanese Patent Publication No. 4177493
Patent Document 3: Japanese Patent Publication No. 2511700
Patent Document 4: Japanese Unexamined Patent Application Publication No. 2000-128626

SUMMARY OF THE INVENTION

Problems to be Solved by the Invention

The materials disclosed in Patent Documents 1 to 4, however, have insufficient breakage resistance and wear resistance for applications in, for example, cutting of heat resistant super alloys, which is performed under high-load and high-temperature conditions. In an aspect of the present invention, it is desirable to provide a ceramic sintered body that has excellent breakage resistance and wear resistance.

Means for Solving the Problems

A ceramic sintered body according to an aspect of the present invention is characterized in that the ceramic sintered body includes tungsten carbide, zirconia, and alumina, that the content of the tungsten carbide is 20 to 50 vol %, that the content of the zirconia is 5 to 25 vol %, that the crystal phase of the zirconia is a tetragonal crystal or a mixture of tetragonal and monoclinic crystals, that the ceramic sintered body does not substantially include Ti compounds, and that the average particle diameter of the tungsten carbide, the average particle diameter of the zirconia, and the average particle diameter of the alumina are all 1 μm or less.

The ceramic sintered body according to the aspect of the present invention has excellent breakage resistance and wear resistance even under high-load and high-temperature conditions.

In a ceramic sintered body according to an aspect of the present invention, the average particle diameter of the tungsten carbide is preferably 0.7 μm or less. In such a case, the breakage resistance and the wear resistance are still more improved.

In a ceramic sintered body according to an aspect of the present invention, a zirconium element is preferably distributed in the grain boundaries between the alumina and the tungsten carbide. In such a case, the breakage resistance and the wear resistance are still more improved.

A joined body according to an aspect of the present invention may be such that a first member made of the above-described ceramic sintered body and a second member made of super hard alloy or cermet are joined together. Such a joined body has excellent breakage resistance and wear resistance even under high-load and high-temperature conditions.

BRIEF DESCRIPTION OF THE DRAWINGS

FIG. 2A is a perspective view illustrating a configuration of a first member 1 and a second member 3, and FIG. 2B is a perspective view illustrating a configuration of a joined body 5.

EXPLANATION OF REFERENCE NUMERALS

Figure 1A:
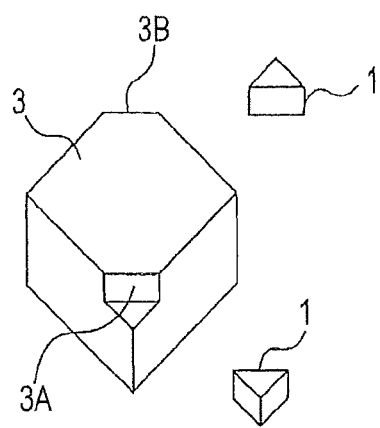
FIG. 1A is a perspective view illustrating a configuration of first members 1 and a second member 3.

1 . . . first member, 3 . . . second member, 3A, 3B . . . vertex, 5 . . . joined body

MODE FOR CARRYING OUT THE INVENTION

An embodiment of the present invention will be described hereinafter.

A ceramic sintered body according to one embodiment of the present invention includes alumina. In the ceramic sintered body according to the present invention, the remainder other than tungsten carbide and zirconia can be alumina, for example. By including alumina, the ceramic sintered body becomes chemically stable to thereby have still more improved wear resistance. The average particle diameter of the tungsten carbide, the zirconia, and the alumina is preferably 1 μm or less. In such a case, the ceramic sintered body has higher hardness and strength, and still higher breakage resistance. The average particle diameter in the present invention means the value measured by the intercept method performed based on images obtained by observing, with a SEM, a mirror-polished sintered body that has been processed by etching.

The ceramic sintered body according to the present invention can produce the following effects by including 20 to 50 vol % tungsten carbide. The content of the tungsten carbide is the content when the whole ceramic sintered body is defined as 100 vol %.

- The homogeneous dispersion effect of the tungsten carbide can restrain grain growth. As a result, the ceramic sintered body has improved strength and hardness.
- The high toughness, low thermal expansion, and high thermal conductivity of the ceramic sintered body are realized.
- The ceramic sintered body has high sinterability and oxidation resistance by including 50 vol % or less tungsten carbide.
- The average particle diameter of the tungsten carbide is particularly preferably 0.7 μm or less. The above-described dispersion effect is still more enhanced by including tungsten carbide having a smaller average particle diameter.

The ceramic sintered body according to the present invention does not substantially include Ti compounds (for example, carbide, carbon nitride, or nitride of Ti). This leads to the improved strength, thermal properties, and breakage resistance of the ceramic sintered body. "Not substantially include" means that the ceramic sintered body may include none or may include a very small amount that does not affect the function and effect of the ceramic sintered body according to the present invention (for example, the amount corresponding to inevitable impurities). The very small amount that does not affect the function and effect is the amount of, for example, 0.1 wt % or less when the whole ceramic sintered body is defined as 100 wt %.

If Ti compounds were included, the following effects would be produced. The Ti compounds and the tungsten carbide would form a solid solution ($W_X$—$Ti_{1-X}$—C) at the temperature range where the ceramic sintered body according to the present invention is sintered. The solid-solutioned tungsten carbide ($W_X$—$Ti_{1-X}$—C) would have reduced hardness and thermal conductivity to thereby have reduced cutting performance. Since Ti compounds have higher thermal expansion than tungsten carbide, the ceramic sintered body as a whole would also have higher thermal expansion to thereby have reduced thermal shock resistance. Furthermore, the difference in the thermal expansion coefficient from the alumina or zirconia would be reduced, resulting in a reduced strengthening effect of the residual stresses.

The ceramic sintered body according to the present invention may inevitably be contaminated by Fe, Ni, Co, and Cr due to manufacturing reasons. In such a case, the Fe, Ni, Co, and Cr contents are preferably very small amounts that do not affect the function and effect of the ceramic sintered body according to the present invention.

Specifically, when the whole ceramic sintered body is defined as 100 wt %, the Fe content is preferably 0.04 wt % or less, and more preferably 0.03 wt % or less. Also, the Ni content is preferably 0.02 wt % or less, and more preferably 0.015 wt % or less. The Co content is preferably 0.03 wt % or less, and more preferably 0.02 wt % or less. The Cr content is preferably 0.03 wt % or less, and more preferably 0.02 wt % or less.

By including Fe, Ni, Co, and Cr contents equal to or below the above-described upper limit values, the grain-boundary bonding strength in the ceramic sintered body increases to thereby improve the high-temperature strength and hardness of the ceramic sintered body.

The ceramic sintered body according to the present invention has high fracture toughness, as including therein 5 to 25 vol % zirconia can effectively produce stress-induced transformation. Also, by making the content of zirconia, which is normally inferior in wear resistance and thermal shock resistance, to be 25 vol % or less, the wear resistance and the thermal shock resistance can be made such that cause no problem when used for cutting, etc. The content of the zirconia is the content when the whole ceramic sintered body is defined as 100 vol %.

The ceramic sintered body according to the present invention, especially in a case where 30 to 40 vol % tungsten carbide is included, preferably includes zirconia in a range of 5 to 25 vol % to thereby have superior breakage resistance and wear resistance. In a case where 20 to 30 vol % tungsten carbide is included, 5 to 15 vol % zirconia is more preferably included from a viewpoint of breakage resistance. In a case where 40 to 50 vol % tungsten carbide is included, 5 to 15 vol % zirconia is more preferably included from a viewpoint of wear resistance.

The ceramic sintered body according to the present invention mainly includes WC as tungsten carbide, but may include a very small amount of $W_2C$ in a case such as where no adjustment of the carbon content is performed in manufacturing the ceramic sintered body. Even in such a case, the properties of the ceramic sintered body are less likely to be impaired since the $W_2C$ content is usually very small.

In the ceramic sintered body according to the present invention, the crystal phase of the zirconia is a tetragonal crystal, or a mixture of tetragonal and monoclinic crystals. This allows for stress-induced transformation to thereby increase the strength and toughness of the ceramic sintered body. The crystal phase of the zirconia can be identified by, for example, an X-ray diffraction analyzer or a Raman spectroscopic device. A stabilizer such as yttria, ceria, magnesia, and calcia may be used to make the crystal phase of the zirconia a tetragonal crystal, or a mixture of tetragonal and monoclinic crystals. In the ceramic sintered body according to the present invention, the average particle diameter of the zircona is 1 μm or less. This allows the crystal phase of the zirconia to be easily maintained in a state of a tetragonal crystal, or a mixture of tetragonal and monoclinic crystals.

In the ceramic sintered body according to the present invention, a zirconium element is preferably distributed in the grain boundaries between the alumina and the tungsten carbide. In such a case, the sinterability is improved, and the grain boundary bonding strength is improved. It is presumed that this is because the zirconium element raises the grain boundary bonding strength. More specifically, alumina, which is an oxide and is chemically stable, and tungsten carbide, which is a carbide, are hard to react with each other, and therefore, a sufficient bonding strength cannot usually be obtained between the two. It is presumed, however, that through an inclusion of a zirconium element in the grain boundaries, the bonding strength at the grain boundaries between the alumina and the tungsten carbide is raised since the zirconium element forms zirconia having good reactivity with alumina and has good reactivity with tungsten, which is also a transition metal. As a result of the improved grain boundary bonding strength, the chipping resistance of a tool made of the ceramic sintered body according to the present invention is improved, resulting in a longer life of the tool.

In order to distribute a zirconium element in the above-described grain boundaries, each component should be fully dispersed by a technique of bead mill grinding, etc., in manufacturing the ceramic sintered body. The use of fine zirconia powders or a solvent of zirconium salt as a zirconia raw material enables an effective distribution of the zirconium element in the grain boundaries. In addition, dispersive mixing in which only a zirconia raw material is ground in advance and the use of a zirconia grinding medium are also effective.

Also, the optimization of the temperature rising rate and the hold time at the time of sintering can accelerate the movement (diffusion) of the zirconium element.

The ceramic sintered body according to the present invention can be made, for example, without a whisker raw material. In such a case, the ceramic sintered body is manufactured at a lower cost.

The ceramic sintered body according to the present invention can be, for example, a material for a tool (a cutting tool for hard-to-cut materials such as heat resistant super alloys). In such a case, a cutting tool that provides excellent cutting performance can be manufactured.

EXAMPLE 1

1. Manufacturing Method of Ceramic Sintered Body

The following three types of material powders were weighed each in a predetermined amount, inserted together with ethanol into a mill made of resin, and ground using alumina balls for 48 hours, to thereby obtain a slurry.

Alumina powders with an average particle diameter of 0.4 μm

Tungsten carbide powders with an average particle diameter of 0.1 to 1.5 μm

Zirconia powders with an average particle diameter of 0.6 μm (including 0 to 8 mol % yttria as a stabilizer)

The obtained slurry was warmed in hot water to remove ethanol and sieved to obtain mixed powders. The mixed powders were inserted into a carbon mold and hot-press sintered to obtain a ceramic sintered body. The conditions for the hot-press sintering were as follows:

Sintering temperature: 1650° C.
Sintering time: 2 hours
Pressure: 30 MPa
Atmosphere: Ar gas In the above-described manufacturing method, the compounding ratio of the material powders, the average particle diameter of the tungsten carbide powders, and the content of the yttria in the zirconia powders were variously changed to manufacture the ceramic sintered bodies of S1 to S20 and S30 to S36, which satisfy the compositions shown in Table 1. Only S35, however, was sintered under rapidly raised temperatures (30° C./min or more) instead of the above-described hot-press sintering conditions.

TABLE 1

| Sample | Composition Alumina vol % | Composition Tungsten Carbide vol % | Composition Zirconia vol % | Particle Diameter of Tungsten Carbide Raw Material μm | Stabilizer Content in Zirconia mol % | Zirconia Crystal Phase | Average Particle Diameter of Tungsten Carbide μm | Average Particle Diameter of Alumina μm | Average Particle Diameter of Zirconia μm |
|---|---|---|---|---|---|---|---|---|---|
| S1 | 85 | 0 | 15 | — | 2 | T | — | 0.6 | 0.3 |
| S2 | 75 | 10 | 15 | 0.4 | 2 | T | 0.3 | 0.5 | 0.3 |
| S3 | 65 | 20 | 15 | 0.4 | 2 | T | 0.3 | 0.4 | 0.3 |
| S4 | 55 | 30 | 15 | 0.4 | 2 | T | 0.3 | 0.4 | 0.3 |
| S5 | 45 | 40 | 15 | 0.4 | 2 | T | 0.3 | 0.4 | 0.3 |
| S6 | 35 | 50 | 15 | 0.4 | 2 | T | 0.4 | 0.5 | 0.3 |
| S7 | 25 | 60 | 15 | 0.4 | 2 | T | 0.4 | 0.5 | 0.3 |
| S8 | 70 | 30 | 0 | 0.4 | 2 | T | 0.3 | 0.8 | — |
| S9 | 68 | 30 | 2 | 0.4 | 2 | T | 0.3 | 0.5 | 0.3 |
| S10 | 65 | 30 | 5 | 0.4 | 2 | T | 0.3 | 0.6 | 0.3 |
| S11 | 60 | 30 | 10 | 0.4 | 2 | T | 0.3 | 0.4 | 0.3 |
| S12 | 50 | 30 | 20 | 0.4 | 2 | T | 0.3 | 0.4 | 0.3 |
| S13 | 40 | 30 | 30 | 0.4 | 2 | T | 0.4 | 0.3 | 0.4 |
| S14 | 55 | 30 | 15 | 0.4 | 0 | T, M | 0.3 | 0.4 | 0.3 |
| S15 | 55 | 30 | 15 | 0.4 | 3 | T | 0.3 | 0.4 | 0.3 |
| S16 | 55 | 30 | 15 | 0.4 | 8 | C | 0.3 | 0.6 | 0.3 |
| S17 | 55 | 30 | 15 | 0.1 | 2 | T | 0.1 | 0.6 | 0.3 |
| S18 | 55 | 30 | 15 | 0.6 | 2 | T | 0.4 | 0.8 | 0.5 |
| S19 | 55 | 30 | 15 | 1.5 | 2 | T | 1.1 | 0.8 | 0.5 |
| S20 | 55 | 30 | 15 | 1.5 | 2 | T | 1.2 | 1.2 | 1.2 |

TABLE 1-continued

| Sample | Composition | | | Particle Diameter of Tungsten Carbide Raw Material μm | Stabilizer Content in Zirconia mol % | Zirconia Crystal Phase | Average Particle Diameter of Tungsten Carbide μm | Average Particle Diameter of Alumina μm | Average Particle Diameter of Zirconia μm |
|---|---|---|---|---|---|---|---|---|---|
| | Alumina vol % | Tungsten Carbide vol % | Zirconia vol % | | | | | | |
| S21 | 55 | Tungsten Carbide: 25 Titanium Carbide: 5 | 15 | Tungsten Carbide: 0.4 Titanium Carbide: 0.9 | 2 | T | 0.4 | 0.8 | 0.5 |
| S22 | 55 | Tungsten Carbide: 15 Titanium Carbide: 15 | 15 | Tungsten Carbide: 0.4 Titanium Carbide: 0.9 | 2 | T | 0.3 | 0.8 | 0.4 |
| S23 | 55 | Tungsten Carbide/Titanium Solid Solution (W 0.5, Ti 0.5) C 30 | 15 | 1.0 | 2 | T | 0.3 | 0.8 | 0.5 |
| S24 | 55 | Titanium Carbide: 30 | 15 | 0.9 | 2 | T | 0.7 | 0.8 | 0.5 |
| S25 | 55 | Titanium Nitride: 30 | 15 | 1.2 | 2 | T | 0.7 | 0.8 | 0.7 |
| S26 | 55 | Titanium Carbonitride: 30 | 15 | 1.1 | 2 | T | 0.7 | 0.9 | 0.8 |
| S27 | Alumina/SiC Whisker-Based Tool | | | — | — | — | — | — | — |
| S28 | SiAlON-Based Tool | | | — | — | — | — | — | — |
| S29 | Alumina/TiC-Based Tool | | | — | — | — | — | — | — |
| S30 | 55 | 40 | 5 | 0.4 | 2 | T | 0.4 | 0.5 | 0.4 |
| S31 | 50 | 40 | 10 | 0.4 | 2 | T | 0.3 | 0.4 | 0.4 |
| S32 | 40 | 40 | 20 | 0.4 | 2 | T | 0.3 | 0.4 | 0.5 |
| S33 | 55 | 30 | 15 | 1.2 | 2 | T | 1.0 | 0.5 | 0.3 |
| S34 | 55 | 30 | 15 | 0.4 | 2 | T | 0.5 | 1.0 | 0.8 |
| S35 | 55 | 30 | 15 | 0.4 | 2 | T | 0.4 | 0.4 | 0.3 |
| S36 | 55 | 30 | 15 | 0.4 | 2 | T | 0.4 | 1.4 | 0.3 |

The ceramic sintered bodies of S21 and S22 were manufactured, basically in a similar manner as in the above-described manufacturing method, but by adding titanium carbide in addition to tungsten carbide, zirconia, and alumina. Also, the ceramic sintered bodies of S23 to S26 were manufactured, basically in a similar manner as in the above-described manufacturing method, but by adding one of a tungsten carbide/titanium solid solution, titanium carbide, titanium nitride, and titanium carbonitride in place of tungsten carbide.

2. Analysis of Ceramic Sintered Body

By observing, with an SEM, the grain boundaries in the ceramic sintered bodies of S1 to S20 and S30 to S36, it was confirmed that a zirconium element was distributed in the grain boundaries between the alumina and the tungsten carbide, except for S35. In S35, which was sintered under the rapidly raised temperatures, no zirconium element was distributed in the grain boundaries between the alumina and the tungsten carbide.

In each of the ceramic sintered bodies of S1 to S26 and S30 to S36, the crystal phase of the zirconia was measured by Raman spectroscopy. The results are shown in the "Zirconia Crystal Phase" column of the above Table 1. In Table 1, "T" represents a tetragonal crystal, "M" represents a monoclinic crystal, "C" represents a cubic crystal, and "T, M" represents a mixture of tetragonal and monoclinic crystals.

In each of the ceramic sintered bodies of S1 to S26 and S30 to S36, the average particle diameter of the tungsten carbide, the average particle diameter of the zirconia, and the average particle diameter of the alumina were measured. The results are shown in the above Table 1. The average particle diameters shown in Table 1 are the values measured by the intercept method using SEM images photographed at a magnification of ten thousand times or more.

3. Evaluation of Ceramic Sintered Body (1) Measurement of Three-Point Bending Strength, Vickers Hardness, and Fracture Toughness With each of the ceramic sintered bodies of S1 to S26 and S30 to S36, a specimen of 3×4×15 mm was made to measure the three-point bending strength (with a span of 10 mm), the vickers hardness, and the fracture toughness (IF method) thereof. Also, the thermal conductivity at a room temperature and the thermal expansion at 600° C. were measured in a predetermined shape. Furthermore, a alumina/whisker-based tool (hereafter referred to as S27), a SiAlON-based tool (hereafter referred to as S28), and an alumina/TiC-based tool (hereafter referred to as S29) that were commercially available were measured in a similar manner. The results are shown in Table 2. In Table 2, the three-point bending strength is indicated as "Bending Strength", and the Vickers hardness is indicated as "Hardness".

TABLE 2

| Sample | Bending Strength MPa | Fracture Toughness MPa·m^0.5 | Hardness Hv | Thermal Expansion Coefficient ppm/K | Thermal Conductivity W/mK | Cutting Test 1 Feed Rate | | | | | Evaluation | Cutting Test 2 | | | Finished Surface ⊚△X |
|---|---|---|---|---|---|---|---|---|---|---|---|---|---|---|---|
| | | | | | | 0.55 mm/rev. | 0.60 mm/rev. | 0.65 mm/rev. | 0.70 mm/rev. | 0.75 mm/rev. | | Wear Amount After 2 Passes at 240 m/min mm | Wear Amount After 2 Passes at 360 m/min mm | Wear Amount After 2 Passes at 480 m/min mm | |
| S1 | 1450 | 3.7 | 1850 | 7.6 | 17 | Broken | | | | | X | Broken | Broken | Broken | X |
| S2 | 1530 | 4.0 | 1900 | 7.4 | 19 | ○ | ○ | Broken | | | X | Broken | 0.32(F) | 0.30(F) | △ |
| S3 | 1850 | 4.4 | 2010 | 7.1 | 22 | ○ | ○ | ○ | ○ | Broken | ○ | 0.23 | 0.21 | 0.18 | ○ |
| S4 | 2010 | 4.5 | 2110 | 6.9 | 23 | ○ | ○ | ○ | ○ | ○ | ⊚ | 0.19 | 0.13 | 0.11 | ○ |
| S5 | 2050 | 5.0 | 2120 | 6.5 | 26 | ○ | ○ | ○ | ○ | ○ | ⊚ | 0.16 | 0.13 | 0.09 | ○ |
| S6 | 1930 | 5.4 | 2150 | 6.3 | 31 | ○ | ○ | ○ | ○ | ○ | ⊚ | 0.12 | 0.09 | 0.08 | ○ |
| S7 | 1100 | 5.5 | 2350 | 6.0 | 42 | ○ | ○ | ○ | Broken | | △ | 0.10(F) | Broken | Broken | △ |
| S8 | 780 | 4.7 | 2250 | 6.5 | 29 | ○ | Broken | | | | X | Broken | 0.20(F) | 0.20(F) | ○ |
| S9 | 810 | 4.8 | 2250 | 6.5 | 28 | ○ | Broken | | | | X | Broken | 0.19(F) | 0.19(F) | ○ |
| S10 | 1300 | 5.0 | 2210 | 6.6 | 28 | ○ | ○ | ○ | ○ | ○ | ⊚ | 0.14 | 0.13 | 0.11 | ○ |
| S11 | 1430 | 4.1 | 2300 | 6.8 | 28 | ○ | ○ | ○ | ○ | ○ | ⊚ | 0.18 | 0.12 | 0.09 | ○ |
| S12 | 1710 | 4.6 | 2060 | 7.0 | 25 | ○ | ○ | ○ | ○ | Broken | ○ | 0.23 | 0.19 | 0.17 | ○ |
| S13 | 1820 | 5.8 | 1900 | 7.1 | 21 | ○ | ○ | ○ | Broken | | △ | 0.34(F) | 0.49(F) | Broken | X |
| S14 | 1800 | 4.6 | 2000 | 6.8 | 23 | ○ | ○ | ○ | ○ | ○ | ⊚ | 0.2 | 0.13 | 0.13 | ○ |
| S15 | 2000 | 4.5 | 2050 | 6.9 | 24 | ○ | ○ | ○ | ○ | Broken | ○ | 0.19 | 0.13 | 0.11 | ○ |
| S16 | 1210 | 4.0 | 1810 | 7.2 | 22 | ○ | ○ | Broken | | | △ | Broken | 0.50(F) | 0.32(F) | △ |
| S17 | 2150 | 4.9 | 2180 | 7.0 | 24 | ○ | ○ | ○ | ○ | ○ | ⊚ | 0.22 | 0.13 | 0.16 | ○ |
| S18 | 2090 | 5.4 | 2020 | 7.0 | 23 | ○ | ○ | ○ | Broken | | △ | 0.22 | 0.14 | 0.16 | △ |
| S19 | 1710 | 5.3 | 1930 | 6.7 | 24 | ○ | ○ | ○ | ○ | ○ | △ | 0.23(F) | 0.16(F) | 0.23(F) | △ |
| S20 | 1490 | 5.6 | 1900 | 7.0 | 23 | ○ | ○ | Broken | | | X | Broken | 0.22(F) | 0.22(F) | △ |
| S21 | 1660 | 4.5 | 2010 | 6.8 | 21 | ○ | ○ | Broken | | | X | Broken | 0.50(F) | 0.45 | △ |
| S22 | 1830 | 4.3 | 1990 | 7.1 | 19 | ○ | ○ | Broken | | | X | Broken | 0.55(F) | 0.50(F) | X |
| S23 | 1260 | 4.1 | 1940 | 7.3 | 16 | ○ | ○ | Broken | | | X | Broken | 0.48(F) | 0.45(F) | X |
| S24 | 1500 | 4 | 2030 | 7.4 | 17 | ○ | Broken | | | | X | Broken | 0.67(F) | Broken | X |
| S25 | 1550 | 4.3 | 1750 | 8.2 | 23 | ○ | Broken | | | | X | Broken | Broken | Broken | X |
| S26 | 1580 | 4.6 | 1780 | 7.9 | 21 | ○ | Broken | | | | X | Broken | 0.90(F) | Broken | X |
| S27 | 1100 | 5.2 | 2030 | 6.4 | 35 | ○ | ○ | ○ | ○ | Broken | ○ | Broken | Broken | Broken | X |
| S28 | 1100 | 5.5 | 1500 | 3.5 | 36 | ○ | ○ | Broken | | | X | 0.52(F) | 0.37(F) | Broken | X |
| S29 | 800 | 3.5 | 2240 | 8 | 20 | ○ | Broken | | | | X | Broken | Broken | Broken | X |
| S30 | 1190 | 4.8 | 2310 | 6.2 | 30 | ○ | ○ | ○ | ○ | ○ | ⊚ | 0.19 | 0.15 | 0.13 | ○ |
| S31 | 1490 | 4.9 | 2200 | 6.4 | 28 | ○ | ○ | ○ | ○ | ○ | ⊚ | 0.23 | 0.18 | 0.15 | ○ |
| S32 | 1910 | 5.2 | 2090 | 6.8 | 26 | ○ | ○ | ○ | ○ | ○ | ⊚ | 0.29 | 0.25 | 0.2 | ○ |
| S33 | 1790 | 4.8 | 2000 | 6.9 | 24 | ○ | ○ | ○ | Broken | | △ | 0.25(F) | 0.2 | 0.18 | △ |
| S34 | 1900 | 4.9 | 1990 | 7 | 24 | ○ | ○ | ○ | Broken | | ⊚ | 0.35 | 0.28 | 0.22 | △ |
| S35 | 1650 | 4.6 | 2100 | 7 | 23 | ○ | ○ | ○ | Broken | | △ | 0.23(F) | 0.17 | 0.15 | ○ |
| S36 | 1800 | 5 | 1950 | 7.1 | 24 | ○ | ○ | ○ | Broken | | △ | 0.37(F) | 0.32(F) | 0.25 | △ |

(2) Cutting Tests

With each of the ceramic sintered bodies of S1 to S36, a cutting tip was made to perform cutting tests. The following two types of cutting tests were performed.

(a) Cutting Test 1 (Cast Iron Intermittent Cutting Test)

(a-1) Test Conditions

Tip # shape: SNGN432-TN
Cutting workpiece: FC200
Cutting speed: 200 m/min
Cutting depth: 1.5 mm
Feed rate: 0.55 to 0.75 mm/rev
Coolant: Absent (a-2) Evaluation Method If no breakage occurred after 5 cutting passes at a fixed feed rate, the process was repeated at a feed rate elevated in 0.05 mm/rev steps until the feed rate reached 0.75 mm/rev. The breakage resistance was evaluated by the feed rate at which breakage occurred. More specifically, in the "Feed Rate" column in "Cutting Test 1" of Table 2, "○" is indicated for a case where no breakage occurred at the respective feed rates, and "Broken" is indicated for a case where breakage occurred. As shown in "Evaluation" column in "Cutting Test 1" of Table 2, the evaluation was made so as to indicate "X" for a case where breakage occurred at or before the feed rate of 0.65 mm/rev, "Δ" for a case where breakage occurred at the feed rate of 0.70 mm/rev, "○" for a case where breakage occurred at the feed rate of 0.75 mm/rev, and "⊙" for a case where no breakage occurred.

(a-3) Test Results

The test results are shown in the above Table 2. The ceramic sintered bodies of S3 to 6, 10 to 12, 14, 15, 17, 18, 30 to 32, and 34 had higher breakage resistance compared with the others.

(b) Cutting Test 2 (Heat Resistant Super Alloy Turning Test)

(b-1) Test Conditions

Tip shape: RCGX120700T01020
Cutting workpiece: INCONEL 718 forging
Cutting speed: 240 to 480 m/min
Cutting depth: 1.0 mm
Feed rate: 0.2 mm/rev
Coolant: Present (b-2) Evaluation Method The conditions (beauty) of the finished surfaces were evaluated in three grades: ○ (Good), Δ (Intermediate), and X (Bad), on the basis of the boundary wear amount, the edge conditions (the presence or absence of chipping, etc.), and the finished surface conditions after 2 cutting passes at each speed.

Each was measured for wear amount at the cutting speeds of 240, 360, and 480 m/min.

(b-3) Test Results

The test results are shown in the above Table 2. In Table 2, (F) represents an occurrence of flaking. The ceramic sintered bodies of S3 to 6, 10 to 12, 14, 15, 17, 18, and 30 to 35 had higher breakage resistance and wear resistance compared with the others. Also, the ceramic sintered bodies of S3 to 6, 10 to 12, 14, 15, 17, 18, and 30 to 35 had more beautiful finished surfaces compared with the others.

4. Effects Produced by Ceramic Sintered Body (1) The ceramic sintered bodies of S3 to 6, 10 to 12, 14, 15, 17, 18, and 30 to 35 had excellent breakage resistance and wear resistance.

(2) The ceramic sintered bodies of S3 to 6, 10 to 12, 14, 15, 17, 18, and 30 to 35 could be produced at lower costs compared with S27.

(3) The use of the ceramic sintered bodies of S3 to 6, 10 to 12, 14, 15, 17, 18, and 30 to 35 enabled machining of heat resistant super alloys at high speed and with high efficiency.

(4) The use of the ceramic sintered bodies of S3 to 6, 10 to 12, 14, 15, 17, 18, and 30 to 35 provided high finished surface accuracy.

(5) The use of the ceramic sintered bodies of S3 to 6, 10 to 12, 14, 15, 17, 18, and 30 to 35 enabled machining of heat resistant super alloys.

In light of the above results, the ceramic sintered bodies of S3 to 6, 10 to 12, 14, 15, 17, 18, and 30 to 35 were confirmed to be useful for finishing of heat resistant super alloys. Specially, the above ceramic sintered bodies showed excellent cutting performance in finishing at the cutting speed of 240 m/min or more. Accordingly, the use of the above ceramic sintered bodies enables highly efficient cutting of heat resistant super alloys. The use of the above ceramic sintered bodies also enables finished surface conditions to be improved.

EXAMPLE 2

1. Manufacturing Method of Joined Body 5

First, as shown in FIG. 1A, a first member 1 made of the ceramic sintered body S5 of the above-described Example 1 and a second member 3 made of super hard alloy (made of WC and a cobalt binder) were manufactured individually. The first member 1 had a triangular prismatic shape. The second member 3 basically had a rectangular parallelepiped shape having cutouts in proportion to the first member 1 at its two vertices 3A and 3B.

Figure 1B:
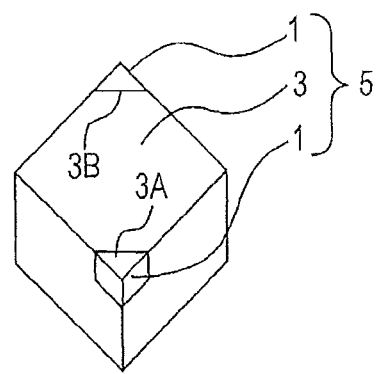
FIG. 1B is a perspective view illustrating a configuration of a joined body 5.

Next, as shown in FIG. 1B, the first member 1 was joined to each of the vertices 3A and 3B of the second member 3 by brazing to thereby complete a joined body 5. The joined body 5 had a rectangular parallelepiped shape that corresponds to DNGA 150408.

2. Evaluation of Joined Body 5 (Part 1)

(1) Test Conditions

Finishing was performed under the following conditions using the joined body 5 as a tip, when the portion of the joined body 5 that mainly contacted the cutting workpiece was the first member 1.

Finishing was also performed under similar conditions using a commercially available cBN tip (a joined body of cBN and super hard alloy manufactured by Sumitomo Electric Industries, Ltd.) and a commercially available PVD coated super hard tool (manufactured by Sumitomo Electric Industries, Ltd.). However, the cutting speed when using the commercially available PVD coated super hard tool was set as 56 m/min. This was because the cutting speed of 240 m/min leads to excessive wear of the commercially available PVD coated super hard tool. The commercially available cBN tip and the commercially available PVD coated super hard tool each had a shape that corresponds to DNGA 150408.

Cutting workpiece: INCONEL 718 forging
Cutting speed: 240 m/min
Cutting depth: 0.4 mm
Feed rate: 0.15 mm/rev
Cooling water: Present (2) Evaluation Method The tip flank wear amount and the surface roughness of the machined surfaces were measured after the finishing. With respect to the tip flank wear amount, 0.3 mm was defined as the end-of-life wear amount. Surface roughness is a distance between convex and concave portions of a machined surface. Smaller surface roughness indicates better machined surface conditions.

(3) Test Results

When the tip of the joined body 5 was used, the flank wear amount was approximately half the end-of-life wear amount after 3 cutting passes and reached the end-of-life wear amount after 5 cutting passes. Also, when the tip of the joined body 5 was used, the machined surface had a remarkably small surface roughness.

On the other hand, when the commercially available cBN tip was used, the flank wear amount reached the end-of-life wear amount after 3 cutting passes. When the PVD coated super hard tool was used, the flank wear amount reached the end-of-life wear amount after 5 cutting passes. Also, when the PVD coated super hard tool was used, the machined surface had a remarkably large surface roughness than when the tip of the joined body was used.

3. Evaluation of Joined Body 5 (Part 2)

(1) Test Conditions

Finishing was performed under the following conditions using the joined body 5 as a tip, when the portion of the joined body 5 that mainly contacted the cutting workpiece was the first member 1.

Finishing was also performed under similar conditions using a commercially available cBN tip (a joined body of cFBN and super hard alloy manufactured by Sumitomo Electric Industries, Ltd.).

Cutting workpiece: INCONEL 718 forging
Cutting speed: 360 m/min
Cutting depth: 0.4 mm
Feed rate: 0.15 mm/rev
Coolant: Present (2) Evaluation Method The tip flank wear amount and the surface roughness of the machined surfaces were measured after the finishing. With respect to the tip flank wear amount, 0.3 mm was defined as the end-of-life wear amount. Surface roughness is a distance between convex and concave portions of a finished surface. Smaller surface roughness indicates superiority.

(3) Test Results

When the tip of the joined body 5 was used, the flank wear amount was less than or equal to half the end-of-life wear amount after 2 cutting passes and did not reach the end-of-life wear amount even after 4 cutting passes. Also, when the tip of the joined body 5 was used, the machined surface had a remarkably small surface roughness.

On the other hand, when the commercially available cBN tip was used, the flank wear amount reached the end-of-life wear amount after 2 cutting passes. Also, when the commercially available cBN tip was used, the machined surface had a remarkably larger surface roughness compared with the case where the tip of the joined body 5 was used.

4. Effects Produced by Joined Body 5

The joined body 5 had excellent breakage resistance and wear resistance even under high-load and high-temperature conditions. Accordingly, the use of the joined body 5 enabled highly efficient cutting of heat resistant super alloys. The use of the joined body 5 also enabled machined surface conditions to be improved.

It is to be understood that the present invention should not be limited to the above-described examples, but may be practiced in various forms without departing from the scope of the invention.

For example, the shape of the joined body 5 should not be limited to the above-described shape, but a joined body 5 having a shape as shown in FIG. 2B may be manufactured by joining by brazing a first member 1 and a second member 3 that have shapes (columnar shapes having downwardly reduced diameters) as shown in FIG. 2A. The material of the second member 3 may be cermet.

The number of the first member 1 included in a single joined body 5 may be either singular of plural (for example, 2, 3, 4 . . . ).

Also, the ceramic sintered body according to the present invention can be used, for example, for friction stir welding or as an impact resistant member.

The method of joining the first member 1 and the second member 3 should not be limited to brazing, but other joining methods (such as a direct diffusion method under pressure) can be used as appropriate.

The invention claimed is:

1. A ceramic sintered body comprising:
tungsten carbide, zirconia, and alumina,
wherein the content of the tungsten carbide is 20 to 50 vol %,
wherein the content of the zirconia is 5 to 25 vol %,
wherein a crystal phase of the zirconia is a tetragonal crystal or a mixture of tetragonal and monoclinic crystals,
wherein the ceramic sintered body does not substantially include Ti compounds, and
wherein an average particle diameter of the tungsten carbide, an average particle diameter of the zirconia, and an average particle diameter of the alumina are all 1 µm or less.

2. The ceramic sintered body according to claim 1,
wherein the average particle diameter of the tungsten carbide is 0.7 µm or less.

3. The ceramic sintered body according to claim 1,
wherein a zirconium element is distributed in grain boundaries between the alumina and the tungsten carbide.

* * * * *